United States Patent [19]
Klein et al.

[11] Patent Number: 4,511,214
[45] Date of Patent: Apr. 16, 1985

[54] FAIRING WHICH FOLDS FLAT INDEPENDANTLY OF ITS MIRROR

[75] Inventors: Wilhelm Klein, Aldingen; Jörg Koske, Weil der Stadt; Siegfried Herzog, Steinenbronn; Hans-Peter Jordan, Schonaich; Wilhelm Bauer; Max Bausch, both of Sindelfingen; Christian Grabner, Gechingen, all of Fed. Rep. of Germany

[73] Assignee: Daimler-Benz Aktiengesellschaft, Fed. Rep. of Germany

[21] Appl. No.: 460,112

[22] Filed: Jan. 21, 1983

[30] Foreign Application Priority Data

Feb. 2, 1982 [DE] Fed. Rep. of Germany ....... 3203371

[51] Int. Cl.$^3$ .......................... G02B 5/08; E04G 3/00
[52] U.S. Cl. .................................. 350/632; 248/900
[58] Field of Search ................ 248/900; 350/288, 289, 350/307

[56] References Cited

U.S. PATENT DOCUMENTS

| | | | |
|---|---|---|---|
| 3,990,774 | 11/1976 | Gotz | 350/307 |
| 4,350,084 | 9/1982 | Azzola | 350/307 X |
| 4,380,370 | 4/1983 | Mittelhauser | 350/307 |

FOREIGN PATENT DOCUMENTS

| | | | |
|---|---|---|---|
| 2546759 | 4/1977 | Fed. Rep. of Germany | 248/900 |
| 2048192 | 12/1980 | United Kingdom . | |

*Primary Examiner*—John K. Corbin
*Assistant Examiner*—David Lewis
*Attorney, Agent, or Firm*—Craig & Burns

[57] ABSTRACT

The invention relates to an exterior mirror for vehicles, with a mirror-housing which, in normal operation, is retained in a fixed location on the vehicle and which, in the event of a collision, can fold away, forwards or backwards, until it assumes at least an approximately flat position against the vehicle. Folding occurs about a pair of pivot-axes. A mirror-shell, carrying a reflector, is retained in the interior of the mirror-housing. An aerodynamically efficient fairing is provided on the leading side of the mirror-housing. In order to be able to design the fairing with a shape which is particularly aerodynamically efficient, namely with a shape which is particularly long in the direction in which the vehicle travels and which resembles a wedge, while nevertheless being able, on the other hand, to permit the mirror to fold away effectively and with little overhang, at least one separate pivot-axis is provided for the fairing of the mirror-housing. This pivot-axis is inclined, in side view, at a pronounced angle relative to the pivot-axes of the mirror-housing. The fairing otherwise merely bears against the mirror-housing in a manner permitting detachment. The fairing is spring-loaded towards the mirror-housing and a vibration-damping, resilient interlayer is provided in the contact zone. The pivot-axis is positioned parallel to an edge-rim of the fairing, in the region of the projecting fitting on the vehicle. That wall of the fairing, which is located opposite, is composed of a conventional resilient material.

5 Claims, 3 Drawing Figures

FAIRING WHICH FOLDS FLAT INDEPENDANTLY OF ITS MIRROR

TECHNICAL FIELD

The invention relates to an exterior mirror for vehicles.

BACKGROUND ART

In known exterior mirrors, a fairing is permanently fastened to the housing by means of screws, and participates in the pivoting movements of the housing in the event of a collision. Only in the region of the projecting fitting is a small portion of the fairing arranged at a fixed location and molded from a yielding rubber so that it can be folded together in the forward direction as the mirror-housing folds away. The two pivot-axes of the known mirror-housing do not need to lie parallel to each other and side-by-side. The axes can be arranged at an angle to one another and to the direction of the force of gravity.

The capability of the exterior mirror to fold away is desirable for road safety in order to minimize injuries and damage in the event of collisions with people. Moreover, in the folded-away condition, the mirror should overhang as little as possible to keep the risk of injury as low as possible. On the other hand, an object is to produce a mirror-fairing which is aerodynamically efficient and which requires a certain minimum dimension in the longitudinal direction of the vehicle to guide the relative airflow around the mirror-housing in as loss-free a manner as possible.

In the periodical "Automobil-Revue", dated Feb. 12, 1981, sketches are shown on page 5 of vehicle design-studies originating from various companies. These studies also show exterior-mirror fairings which, in side view, are wedge-shaped and are particularly aerodynamically efficient. However, mirrors of this type present problems concerning their capability to fold flat in the event of collisions. In a similar study, the fairing of the mirror-housing is clipped to the housing in a detachable manner so that in the event of a collision, it detaches itself from the mirror-housing and falls away. However, this is not permitted under certain safety regulations because self-detaching vehicle components risk injury.

Manufacturing the entire fairing from a yielding rubber is possible. However, such large fairing components cannot be manufactured with adequate stability when employing maximum rubber-hardness values which are permitted by law for mirror components. Thus, they would be unable to withstand relative airflow, even at moderately high vehicle speeds without deforming. Apart from this fact, rubber is a relatively expensive material which can pick up comparatively heavy dirt deposits and which tends to crack as it ages.

SUMMARY OF THE INVENTION

The object of the invention is to provide an exterior mirror in which the fairing is dimensionally stable even at comparatively high vehicle speeds. It is a further object of the invention that the fairing is both resistant to aging and particularly aerodynamically efficient and which can be designed with a shape which, in the direction in which the vehicle travels, resembles a wedge. Another object of the invention is that in the event of a collision, the fairing comes to bear against the vehicle, without falling from it, with minimum possible residual overhang therefrom.

These objects are achieved in the invention by means of the features shown in the drawing. By virtue of the separate capability of the fairing to fold away, in a different direction relative to that in which the mirror-housing can fold away, the two pivotably mounted components, namely the mirror-housing on the one hand and the fairing on the other hand, obstruct each other during the pivoting movement only very slightly, or not at all.

These and other objects, features and advantages of the present invention will become more apparent from the following description when taken in connection with the accompanying drawing which shows, for purposes of illustration only, several embodiments in accordance with the present invention, and wherein:

DISCLOSURE OF THE INVENTION

Figure 1:
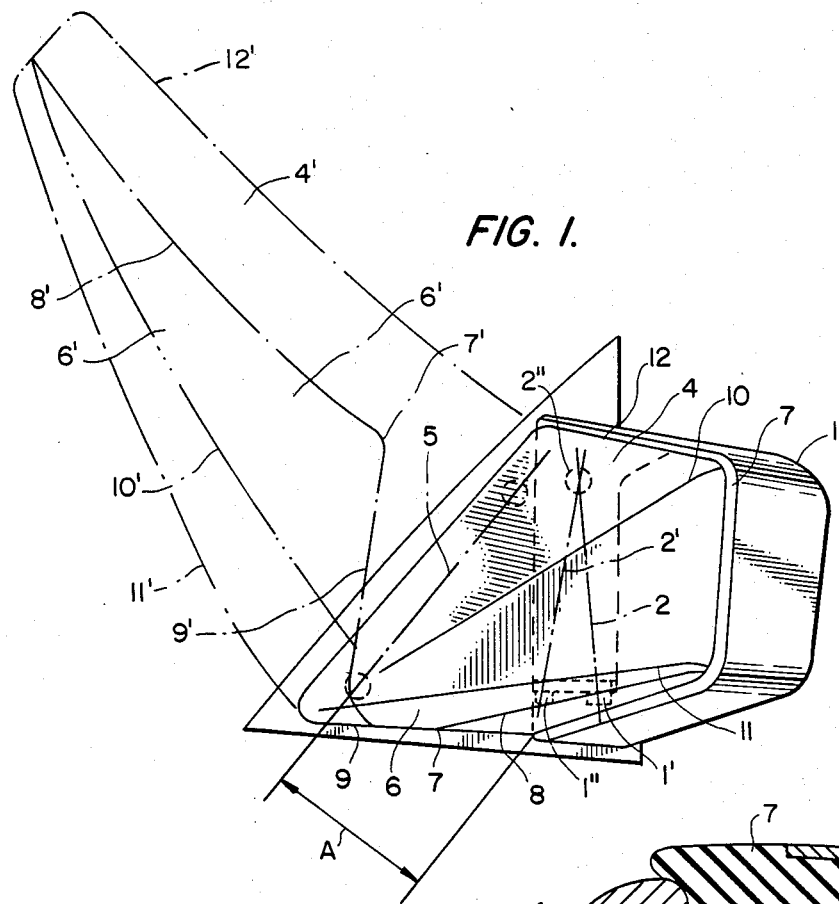
FIG. 1 shows the side view of an illustrative embodiment of an exterior mirror according to the invention.

The exterior mirror shown in the drawing possesses a mirror-housing 1, a mirror-shell 3, which carries the reflector 13, retained in this housing, in an adjustable manner. The frame-like mirror-housing 1 is fastened on the side facing the vehicle to permit folding by two hinge-pins 1' and 1". The pins 1' and 1" are arranged at a distance one behind the other so that the mirror-housing can, in the event of a collision, fold away forwards about axis 2 or backwards about axis 2", until it assumes at least an approximately flat position against the vehicle. The two pivot-axes 2 and 2' are arranged at a distance one from the other. In the illustrative embodiment, they exhibit an acute angle and intersect at a common point 2". With regard to conventional features of this foldable mounting of the mirror-housing 1, reference can be made to the publication previously cited which is hereby incorporated by reference.

An aerodynamically efficient fairing 4 is located on the leading side, that is, the side which leads or faces the direction of forward vehicular travel, of the mirror-housing 1. This fairing 4 is composed of a dimensionally stable conventional material and guides relative airflow around the mirror-housing 1 in a manner which results in low aerodynamic losses. The fairing is designed with a shape, in the forward direction, which resembles a wedge, and has a comparatively high aspect ratio in the direction in which the vehicle travels.

According to the invention, the fairing is likewise retained on the vehicle in a manner enabling it to fold away about a pivot-axis 5. However, this pivot-axis 5 is inclined at a pronounced angle relative to the pivot-axes 2 of the mirror-housing. The fairing otherwise bears against the mirror-housing 1 to permit detachment. In order to avoid vibrations and to ensure secure contact, it is preferred for the fairing to be spring-loaded towards the mirror-housing. This can be effected by means of a torsion spring near pivot axis 5 or by means of a tension spring between the mirror-housing 1 and the fairing 4. A tendency to vibrate and rattle is also avoided by means of a resilient interlayer 7 in the zone where the fairing contacts the mirror-housing. This resilient interlayer can be composed of rubber or the like. The softness of the rubber can be predetermined by specifying an appropriate shore hardness value, or by selecting a specific pore volume in the rubber. In the contact zone, the edge of the fairing dips into a groove, which likewise brings about a stabilizing effect.

In the illustrative embodiment, only a single additional pivot-axis is provided for the fairing 4. It is aligned parallel to an edge-rim of the fairing, in the region of the projecting fitting on the vehicle. In this arrangement, the pivot-axis 5 is positioned at such an edge-rim of the fairing, in a manner whereby the extent of the fairing, projected onto the external surface of the vehicle, is as small as possible. This is in particular the dimension A shown in FIG. 1, which extends from the pivot-axis as far as the opposite corner. This arrangement ensures that the housing overhangs as little as possible when in the folded-away condition.

The fairing can also be mounted so that it folds away about two different pivot-axes, arranged at an angle one to the other, lying parallel to the edge-rims of the fairing, in the region of the projecting fitting on the vehicle. With this arrangement, the hinge-pin, which is ineffective during a collision, is able to detach itself from the mounting device.

Figure 2:
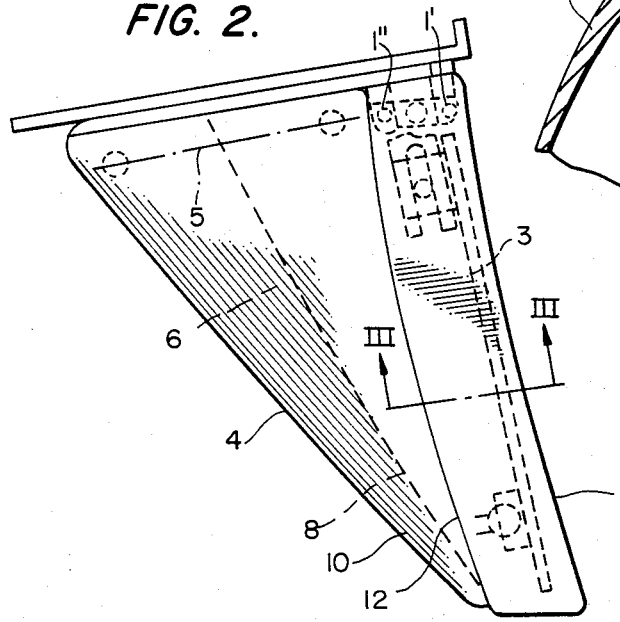
FIG. 2 shows a plan view of the mirror according to FIG. 1.
Figure 3:
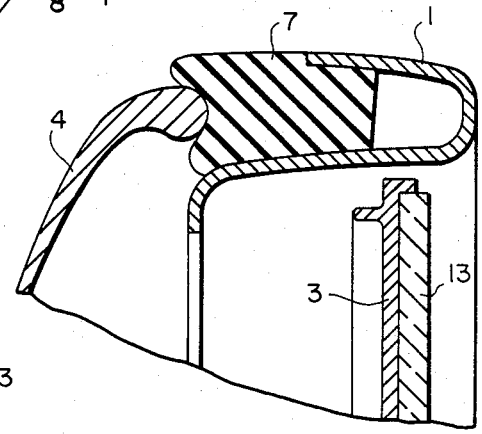
FIG. 3 shows a cross-section through the contact zone of the fairing on the mirror-housing, along the section-line III—III in FIG. 2.

The pivoted position of the fairing, in which it is upwardly folded away, is shown in FIG. 1 by dash/dotted lines. It will be apparent from an inspection of FIG. 1, when considered together with FIGS. 2 and 3, that upon collision, the fairing 4 will rotate about axis 5 to assume a position of 4'. The wedge-shape fairing in this position is such that the surface 6 is positioned at 6', the surface 6 being substantially triangular in character having three edges 8, 9 and 11 assuming the positions 8', 9' and 11' as rotated, the point 7 assuming a position 7'. At the same time, the fairing 4 assumes a position 4' with the edge 12 taking position after rotation about 5 at 12' and the edge 10 assuming a position after rotation at 10'. In this position, that portion of the wall of the fairing 4 which is located opposite to the pivot-axis, at the bottom when in the normal position, projects from the vehicle obliquely at 6', towards the rear. In order to effect yet a further reduction in the risk of injury which could emanate from this projecting wall, a resilient wall-part 6 is provided at this point. This part 6 is composed of a conventional yielding material, for example, rubber. The capability of this lower corner to yield also permits an improvement in the flat position of the mirror-housing 1 towards the front and in the flat position of the fairing 4 if it is downwardly folded away because the resilient wall-part 6 can readily be pushed away in both of the above-mentioned cases.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. An exterior mirror for vehicles comprising a mirror-housing means constructed and arranged in normal operation for being retained in a fixed location on the side of the vehicle and in the event of a collision for being able to fold away, forwards or backwards, until the mirror housing assumes at least an approximately flat position against the vehicle, folding means for pivoting about at least one of first and second pivot-axes located approximately parallel to the exterior surface of the vehicle and arranged one behind the other, a mirror-shell means retained inside the mirror-housing means in a manner permitting adjustment, a reflector carried by the mirror shell, and an aerodynamically efficient fairing covering the mirror-housing means on its leading side, the fairing of the mirror-housing means being constructed for folding away independently and for bearing against the mirror-housing means to permit detachment, folding occurring about at least a third pivot-axis separate from the first and second pivot-axes and the third pivot-axis is arranged at a substantial angle relative to the first and second axes.

2. The exterior mirror according to claim 1, wherein the fairing has spring means and is spring-loaded towards the mirror-housing means, and a resilient interlayer, composed of a vibration-damping material, is provided in a contact zone.

3. The exterior mirror, according to claim 1, wherein the third pivot-axis is parallel to an edge-rim of the fairing near a projecting fitting on the vehicle, and is positioned, at such an edge-rim, in a manner whereby the extent of the fairing, projected onto the external surface of the vehicle at right angles to this edge-rim, is as small as possible.

4. The exterior mirror according to claim 1, wherein a wall of the fairing, located opposite to the pivot-axis is composed, at least in part, of a resiliently yielding material.

5. An exterior mirror assembly for vehicles responsive to vehicular collision to lie substantially flat against a vehicle body comprising
   a mirror housing,
   a fairing,
   means for causing the fairing to rotate about a first axis in response to vehicular collision, and
   means for causing the mirror housing to rotate about a second axis disposed at a substantial angle with respect to the first axis upon vehicular collision.

* * * * *